L. C. W. PRIBNOW.
LAWN MOWER.
APPLICATION FILED JUNE 7, 1920.
1,394,351.
Patented Oct. 18, 1921.
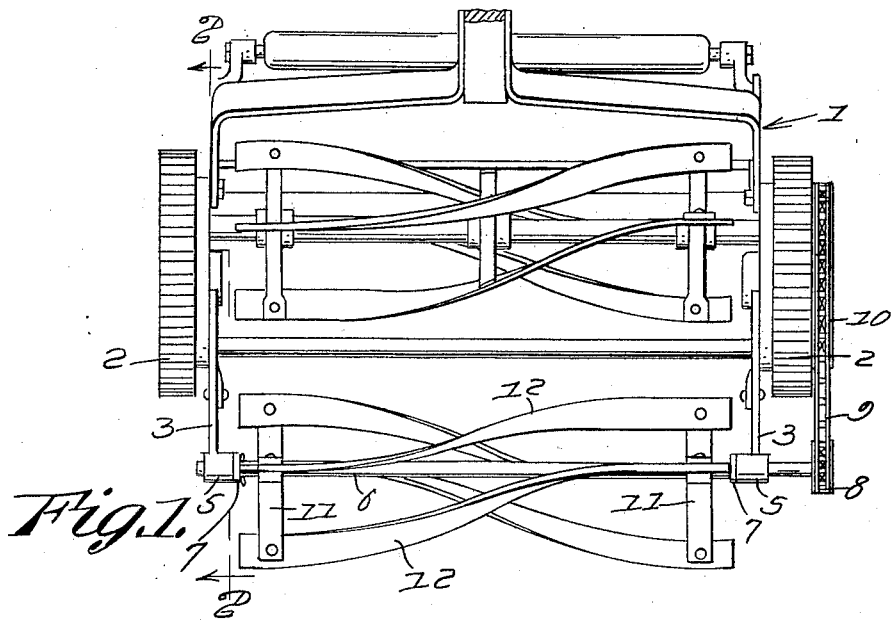
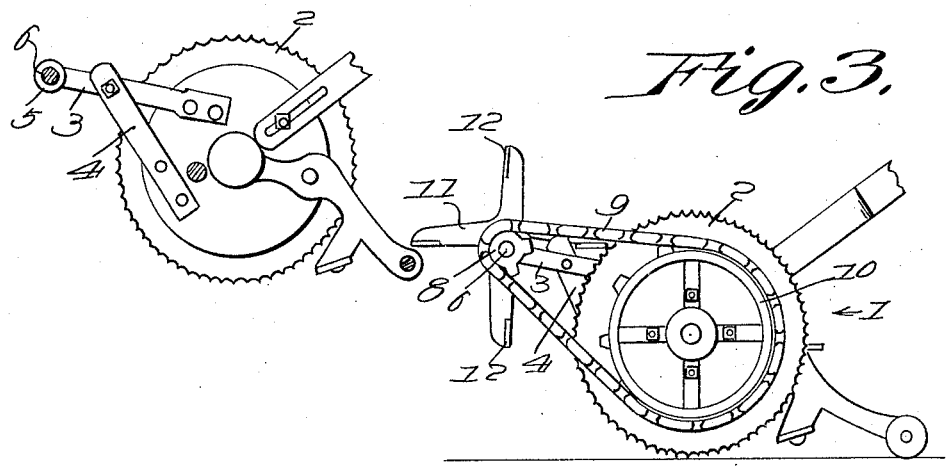
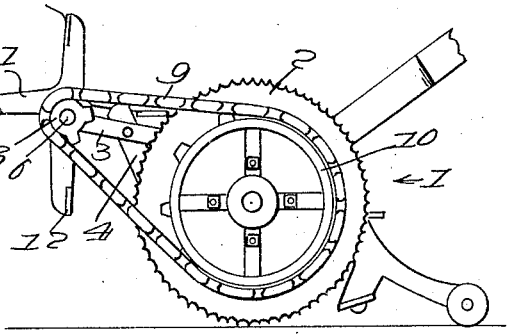
Inventor
Louis C. W. Pribnow,
By E. Hume Talbert
Attorney

UNITED STATES PATENT OFFICE.

LOUIS C. W. PRIBNOW, OF NORFOLK, NEBRASKA, ASSIGNOR TO PAUL G. SCHILLING, OF NORFOLK, NEBRASKA.

LAWN-MOWER.

1,394,351.  Specification of Letters Patent.  Patented Oct. 18, 1921.

Application filed June 7, 1920. Serial No. 387,082.

*To all whom it may concern:*

Be it known that I, LOUIS C. W. PRIBNOW, a citizen of the United States of America, residing at Norfolk, in the county of Madison and State of Nebraska, have invented new and useful Improvements in Lawn-Mowers, of which the following is a specification.

The invention seeks to provide, as its principal object, an attachment for lawn mowers by means of which cutting of dandelions, weeds and high grass may be facilitated.

The invention aims at the provision of a reel attached to and carried in front of the lawn mower, the reel being rotated by and operating to raise long grass so that it may be readily engaged by the cutting blades of the mower.

A further object of the invention is to provide a device of this character which is simple in construction, durable and effective in operation and easy of application, to a conventional form of lawn mower.

While illustrated and described in a specific embodiment, the invention is not to be restricted to such embodiment. The right is reserved to make such changes or alterations as the actual reduction to practice may demand, in so far as such changes or alterations may be comprehended in spirit by the subjoined claim.

In the accompanying drawings:

Figure 1 is a plan view of a lawn mower showing the improved reel attachment;

Fig. 2 is a section on the line 2—2 of Fig. 1,

Fig. 3 is a side elevational view to show the means for driving the reel.

The invention is illustrated applied to a lawn mower 1 which is of the conventional type. On the frame portion of the latter, and adjacent each of the two wheels 2, there are attached brackets 3 which project forwardly from the lawn mower and are suitably retained in position by bracing members 4. The brackets are formed at their outer or forward ends with bearings 5 in which a shaft 6 is journaled, the latter being provided with collars 7 abutting bearings on their facing ends, so that the shaft may be precluded from longitudinal movement. The shaft 6 to one side of the mower extends beyond its attendant bearing 5 a sufficient distance to receive the sprocket wheel 8 by means of which it is driven through the instrumentality of a chain 9 which is trained over it and over a sprocket wheel 10 mounted on one of the wheels 2.

The shaft 6 carries two spiders 11, one positioned adjacent to either of the bearings 5 and these spiders are so arranged on the shaft that the arms on the one are angularly displaced with respect to the arms of the other, this arrangement permitting the reel blades 12 to be connected to the spiders at the free ends of the arms of the latter in such a way that the blades define a spiral. For practical purposes, it is thought best to make the spiders of wood and the blades 12 of tin. It is obvious, however, that any other suitable materials may be used for this purpose.

It will be noted that the reel is supported at a greater height from the ground than the cutting blades of the mower, but being driven by the wheels of the mower through the chain 9, turns in the same direction as the blades when the mower is moved forwardly. Thus long grass, weeds, etc., if they be lying on the ground are raised to a position approaching the vertical before the mower blades reach them. They are thus held in a position where they may be engaged by the blades to be sheared off with the knife of the mower. The blades 12 are made of relatively thin material and should weeds or the like become entangled with them, the blades would operate to tear and sever such weeds, thus leaving the butts to be engaged by the cutters and knife of the mower which follow the weeds.

The invention having been described, what is claimed as new and useful is:

The combination with a lawn mower, of brackets mounted on the frame of the latter and at either side thereof, the brackets having bearings formed in their forward ends which project beyond the forward end of the mower, a shaft journaled in said bearings, spiders carried upon the shaft and provided with radial arms, the arms of one spider having an angular displacement with respect to the arms of the other spider, spiral shaped blades mounted between the arms of the two spiders, and connections between the shaft and one of the mower wheels, whereby the shaft, the spiders and the blades are rotated for the useful purpose specified.

In testimony whereof I affix my signature.

LOUIS C. W. PRIBNOW.